United States Patent [19]
De La Mare

[11] 3,974,129
[45] Aug. 10, 1976

[54] POLYBUTADIENE RESIN

[75] Inventor: Harold E. De La Mare, Houston, Tex.

[73] Assignee: Shell Oil Company, Houston, Tex.

[22] Filed: July 24, 1975

[21] Appl. No.: 599,236

[52] U.S. Cl. ............................ 204/159.24; 526/14; 526/56; 526/75; 526/82; 526/90; 526/271; 526/320
[51] Int. Cl.² ................. C08F 218/14; C08G 81/00
[58] Field of Search ................. 260/78.5 BB, 78.4 D

[56] References Cited
UNITED STATES PATENTS

| | | | |
|---|---|---|---|
| 3,546,184 | 12/1970 | Heidel et al. | 260/78.4 D |
| 3,607,842 | 5/1971 | Parris et al. | 260/78.5 BB |
| 3,766,215 | 10/1973 | Hesse et al. | 260/78.5 BB |
| 3,840,390 | 10/1974 | Kozu et al. | 260/78.5 BB |

Primary Examiner—Joseph L. Schofer
Assistant Examiner—Herbert J. Lilling

[57] ABSTRACT

A curable resin composition is prepared by first reacting a low molecular weight polybutadiene resin with a polycarboxylic acid anhydride of the general formula

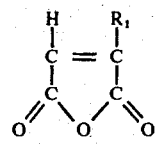

and then reacting the resulting resin with a hydroxyalkyl acrylate of the general formula

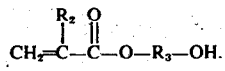

Also disclosed are the cured resin compositions.

8 Claims, No Drawings

POLYBUTADIENE RESIN

THE PRIOR ART

Low molecular weight polybutadiene resin (LMPBR) has been employed in the past for ultra violet curable surface coatings. However, it is necessary to expose these LMPBR formulated coatings to ultra violet radiation for an excessively long period of time in order to achieve an acceptable level of cure.

One means to improve the ultra violet cure time of LMPBR is to maleate the LMPBR before formulation. A particularly useful procedure to maleate polybutadiene is disclosed in Heidel et al., U.S. Pat. No. 3,546,184, wherein the polybutadiene is reacted with maleic anhydride in the presence of a copper inhibitor. While formulated maleated LMPBR has more acceptable curing characteristics than does non-maleated LMPBR, the cure speed is still unacceptable for many applications. A new LMPBR based resin has now been found that has a commercially acceptable cure speed.

SUMMARY OF THE INVENTION

A curable resin composition is disclosed wherein the resin composition is prepared by first reacting a low molecular weight polybutadiene resin with a particular polycarboxylic acid anhydride thereby forming a modified polybutadiene resin with attached anhydride groups and then reacting the modified polybutadiene resin with a hydroxyalkyl acrylate.

DETAILED DESCRIPTION OF THE INVENTION

The curable resin composition is prepared by:

a. reacting a low molecular weight polybutadiene resin having an average molecular weight of between about 500 and about 10,000, a viscosity of between about 50 and about 3000 centipoises, a cis-content of between about 50% and about 95% and containing less than about 2% vinyl bonds with a polycarboxylic acid anhydride of the general formula

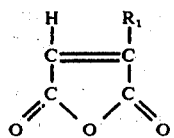

where $R_1$ is selected from the group consisting of H, $CH_3$, and Cl in the presence of a inhibitor and in a weight ratio of anhydride to polybutadiene resin of between about 5:95 and about 50:50 thereby forming a modified polybutadiene resin moiety with attached anhydride groups; and b. reacting said modified polybutadiene resin moiety with a hydroxyalkyl acrylate of the general formula

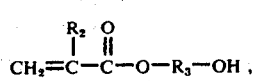

wherein $R_2$ is a hydrogen or methyl group and $R_3$ is an alkyl group of 1 to 10 carbon atoms, in a molar ratio of hydroxyalkyl acrylate to attached anhydride group of between about 25:100 and 100:100.

The LMPBR employed in the present invention has an average molecular weight of between about 500 and about 10,000, a viscosity of between about 50 and about 3000 centipoises, and a microstructure consisting of between about 50% and about 95% cis double bonds, about 5% to about 50 % trans double bonds, and less than about 2% vinyl double bonds. Preferably the LMPBR employed has an average molecular weight of between about 1500 and about 2500 and a cis content of at least 60%.

The LMPBR is produced according to any procedure. One method used to produce the LMPBR is disclosed in Schleimer et al., U.S. Pat. No. 3,329,734, wherein a mixed catalyst is employed, the mixed catalyst comprising a soluble nickel compound and an alkylaluminum halide.

The LMPBR is first reacted with a polycarboxylic acid anhydride of the general formula

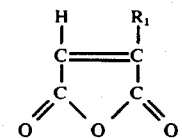

where $R_1$ is selected from the group consisting of H, $CH_3$, and Cl in the presence of an inhibitor to form a modified polybutadiene resin. Examples of suitable anhydrides include maleic anhydride, citraconic anhydride, chloromaleic anhydride, and methyl maleic anhydride. The preferred anhydride is maleic anhydride.

The weight ratio of reacted anhydride to LMPBR varies from about 5:95 to about 50:50, preferably from about 5:95 to about 20:80. Since the Brookfield viscosity of the modified anhydride-LMPBR mixture increases exponentially with an increase in weight ratio of anhydride to LMPBR, a much preferred weight ratio of anhydride to LMPBR is from about 10:90 to about 15:85.

The reaction between the LMPBR and the anhydride results in a shift in the location of the olefinic bond on the LMPBR chain. A typical reaction between LMPBR and maleic anhydride is represented below:

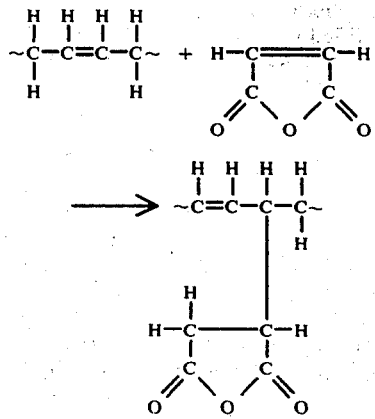

As shown above, the anhydride group is attached directly to the polybutadiene polymer chain.

The inhibitor employed in synthesizing the modified LMPBR is selected from the group consisting of particulate copper, copper salts and copper chelate complexes. Note that the term "inhibitor" as employed here actually refers to a compound that serves as a side reaction inhibitor. A preferred inhibitor is copper naphthenate. As disclosed in Heidel et al., U.S. Pat. No. 3,546,184, the use of a copper additive is useful in controlling the viscosity and preventing gelation in adducts of polybutadiene and maleic anhydride. The amount of copper salt employed varies from about 0.005% weight to about 0.5% weight based on the combined weight of the LMPBR plus anhydride.

The LMPBR, anhydride, and inhibitor are contacted in any suitable manner. In a preferred embodiment the LMPBR, anhydride and Cu napthenate are first charged to a reactor having agitation means. Then the mixture is heated to a temperature of between about 120 °C and about 220°C, preferably between about 170°C and about 200 °C, in the presence of an inert gas. The reaction is terminated once the anhydride has reacted, typically from about 1 to about 5 hours. Reaction pressure may be subatmospheric, atmospheric, or superatmospheric.

The modified polybutadiene resin as prepared above is then reacted with a hydroxyalkyl acrylate of the general formula

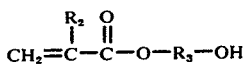

where $R_2$ is a hydrogen or methyl group and $R_2$ is an alkyl group of 1 to 10 carbon atoms. Suitable hydroxyalkyl acrylates include 2-hydroxyethyl acrylate, hydroxypropyl acrylate, 2-hydroxyethyl methacrylate, hydroxypropyl methacrylate, hydroxybutyl acrylate, hydroxyhexyl acrylate and the like. Preferred hydroxyalkyl acrylates are those wherein $R_2$ is hydrogen and $R_3$ is an ethyl or propyl group, i.e. 2-hydroxyethyl acrylate and hydroxypropyl acrylate. A most preferred hydroxyalkyl acrylate is 2-hydroxyethyl acrylate.

The reaction between the hydroxyalkyl acrylate and the modified polybutadiene resin is typified in the reaction formula below wherein a maleated LMPBR is reacted with 2-hydroxyethyl acrylate.

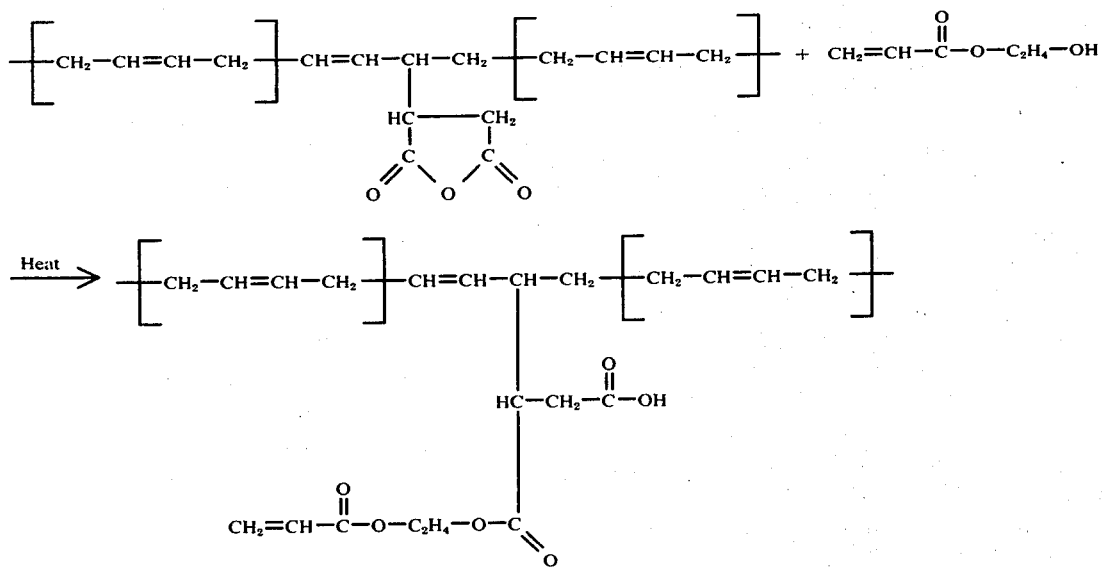

The molar ratio of hydroxyalkyl acrylate to attached anhydride group present in the modified polybutadiene resin varies from about 25:100 to about 100:100, more preferably from about 50:100 to about 100:100. Most preferably it is desired to open all the anhydride rings thereby increasing the acrylate content of the curable resin. However, some of the anhydride rings remain unopened, presumably, without wishing to be bound to any particular theory, because these unopened rings are hindered by some placement in juxtaposition. Accordingly, in some instances it may be advantageous to employ an excess of hydroxyalkyl acrylate. In the latter case the excess acrylate may serve the dual purpose of a monofunctional reactive diluent which is often added to photocurable resin compositions.

The modified polybutadiene resin and hydroxyalkyl acrylate are contacted at a temperature of between about 80°C and about 120°C for between about 24 hours and about 3 hours. While in the usual situation, catalysts are not employed, in some situations it is advantageous to add a catalyst such as a tertiary amine, or a titanate ester such as tetraisopropyl titanate. Reaction pressures may be subatmospheric, atmospheric or superatmospheric.

After the resin composition has been prepared according to the invention, various materials are added to the composition before it is cured. It is often desirable to add an acrylate reactive diluent to the resin composition to improve the cure characteristics of the resin. Examples of reactive diluents include 2-ethyhexyl acrylate, 2-hydroxyethyl acrylate, 2-hydroxypropyl acrylate, trimethylolpropane triacrylate, pentaerythritol triacrylate, neopentylglycol diacrylate, 1,6-hexanediol diacrylate and the like. It should be noted that the formulation of the resin prior to curing takes place typically at ambient temperatures whereas the reaction between the modified polybutadiene resin having attached anhydride groups and the hydroxyalkyl acrylate according to the present invention takes place at elevated temperatures. It is considered that the anhydride ring opening reaction takes place very slowly, if at all, at ambient temperatures.

Other materials are also added to the resin mixtures before they are cured. These materials include plasticizers, stabilizers, extenders, oils, resins, tars, asphalts and the like, as well as all types of coloring or pigments to give the material the desired color. One very useful material to add to the resin composition is the acrylate adduct of multifunctional epoxides, e.g., the resin obtained by reacting the bis-glycidyl ether of Bisphenol A with acrylic acid. It is often useful to add a free radical inhibitor, such as hydroquinone or methylethylhydroquinone, to the resin mixture. For some applications, the curable resin mixture is used in admixture with unsaturated monomers, and preferably liquid monomers possessing at least one $CH_2=C<$ group, such as styrene, alpha-methylstyrene, chlorostyrene, dichlorostyrene, vinyl naphthalene, vinyl phenol and the like; unsaturated esters, such as acrylic and methacrylic esters, vinyl acetate and the like; halides, such as vinyl chloride and vinylidene chloride; nitriles, such as acrylonitrile and methacrylonitrile; diolefins such as butadiene, isoprene and methylpentadiene, and mixtures thereof.

The resin composition is cured by any conventional curing technique including ultra violet radiation, thermal baking, metal catalyzed air drying and the like. Because of the ease with which it cures thermally the resin could also be applied as a water borne self-curing coating. Where it is desired to employ an ultra violet curing system it is necessary to add a photosensitizer. Common photosensitizers include benzoin ethers such as Trigonal 14 and Vincure 10, a dimethylethanol amine/benzophenone mixture, and 2,2-diethoxyacetophenone. Where it is desired to thermally cure the resin composition, the resin is baked at about 100° to about 200°C for between about 2 minutes and about 30 minutes. When metal panels were coated with a resin prepared according to the present invention and baked at 177°C for as little as 4 minutes, the cured panels exhibited excellent cure and adhesion characteristics.

The final modified resin compositions and their above-noted mixtures with other monomers are utilized in a wide variety of different applications. They are utilized in the preparation of coatings and impregnating compositions, in the preparation of adhesives for metals, wood, cement, and the like, and in the preparation of reinforced composite products, such as laminated products, filament windings, and the like. Because of their excellent adhesion to metal surfaces, the resin compositions of the present invention are particularly useful as metal coatings.

The invention is further illustrated by means of the following Illustrative Embodiments and Comparative Examples. Note that the embodiments and examples are given for the purpose of illustration only and that the invention is not to be regarded as limited to any of the specific conditions or reactants recited therein.

In all examples and embodiments, the LMPBR employed was prepared by reacting a solution of 1,4-butadiene in a benzene solvent with a complex catalyst comprising aluminum-diethylchloride and nickel (II) acetylacetonate. The resulting structure of the LMPBR contained about 62% cis bonds, 36% trans bonds, and less than 2% 1,2-vinyl bonds. The Brookfield viscosity of the LMPBR at 77°F was 3.4 poise, the molecular weight ($M_{GPC}$) was about 2150, and the nickel content of the LMPBR ranged from about 20 to about 180 ppm.

In the following examples and embodiments, the composition of the formulated resin is expressed in parts by weight. The quality of the resin as a coating is measured by five different tests commonly employed in the paint industry - MEK rubs, adhesion, hardness, tack and appearance.

The MEK rubs test measures the degree of cure of the coating. The test procedure involves soaking a paper towel (Kimwipe) with methyl ethyl ketone and rubbing the coated panel until the film surface shows visible etching. The higher the degree of cure of the coating, the higher the number of MEK rubs. A coating having a value for MEK rubs of over 100 is deemed to have a very high degree of cure.

The adhesion test measures how well the resin adheres to the panel. In the adhesion test, the coated panel is deeply scribed with a razor blade in a cross hatched design. A piece of cellophane tape is placed over the cross hatching and then is removed. An arbitrary numerical rating from zero (complete lack of adhesion) to 10 (perfect adhesion is assigned to the test film depending upon the portion and pattern of any coating removed within the scribed area.

The hardness (fingernail hardness), tack and appearance tests are all qualitative judgements based on a scale of 1 to 10 with 10 being the best and 1 being the worst.

Except where noted, all test results were taken within about 2 hours after the coated panels were cured.

COMPARATIVE EXAMPLE I

In Comparative Example I, LMPBR was formulated with reactive diluents and a photosensitizer. The reactive diluents employed were alpha-methyl styrene (AMS) and the triacrylate of trimethylolpropane (TMPTA). The photosensitizer employed was a dimethylethanol amine (DMEA)/benzophenone (BzP) photosensitizer package. The formulated resin was applied to two Q ground steel panels in a coating having a thickness of about 0.5 mils. The coated panels were then subjected to ultraviolet light from a 100 watt General Electric mercury vapor lamp for 180 seconds and 360 seconds respectively. The results are presented below in Table I.

TABLE I

| Run No. | | 1 | 2 |
|---|---|---|---|
| Formulation | LMPBR | 80 | 80 |
| | AMS | 15 | 15 |
| | TMPTA | 5 | 5 |
| | BzP | 5 | 5 |
| | DMEA | 5 | 5 |
| Cure Time (seconds) | | 180 | 360 |
| Test Results | MEK Rubs | 7 | 42 |
| | Adhesion | 10 | 10 |
| | Hardness | 8 | 9 |
| | Tack | 10 | 10 |
| | Appearance | 10 | 10 |

COMPARATIVE EXAMPLE II

Comparative Example II reveals the type of cured products obtained with only a maleated LMPBR. The LMPBR was reacted with maleic anhydride at 180°C in a nitrogen atmosphere and in the presence of about 0.3% weight copper naphthenate. The weight ratio of maleic anhydride to LMPBR was approximately 7:93.

The maleated LMPBR (LMPBR-MA) was employed in various formulations and with varing cure times. Both 2-hydroxyethylacrylate (2-HEA) and the trifunctional acrylate of trimethylolpropane (TMPTA) were employed as reactive diluents. The photosensitizer employed was Trigonal 14, a standard benzoin ether. The formulated resin was applied to Q-steel panels in a coating having a thickness of about 0.2 mils. The coated panels were then subjected to ultraviolet light from a 100 watt General Electric mercury vapor lamp for various lengths of time. The various formulations and test results are presented below in Table II:

Inhibitors were added to the curable resin composition such that the composition contained about 1800 ppm of the methyl ether of hydroquinone and about 259 ppm copper. The curable resin composition was formulated with TMPTA and alpha-methyl styrene (AMS) as reactive diluents and with Trigonal 14 as the photosensitizer. The formulated compositions were coated on Q-steel panels at about 0.2 mil thickness and subjected to various cure times under a 100 watt General Electric mercury vapor lamp. The results are presented below in Table III:

TABLE III

| Run No. | | 1 | 2 | 3 | 4 | 5 | 6 | 7 | 8 | 9 |
|---|---|---|---|---|---|---|---|---|---|---|
| Formulation | LMPBR-MA/2-HEA | 100 | 100 | 100 | 95 | 95 | 95 | 80 | 80 | 80 |
| | AMS | — | — | — | — | — | — | 15 | 15 | 15 |
| | TMPTA | — | — | — | — | 5 | 5 | 5 | 5 | 5 |
| | Trig 14 | 10 | 10 | 10 | 10 | 10 | 10 | 10 | 10 | 10 |
| Cure time (seconds) | | 180 | 360 | 540 | 180 | 360 | 540 | 180 | 360 | 540 |
| Tests | MEK Rubs | 20 | 40 | 70 | 35 | 80 | 100 | 30 | 100 | 100 |
| | Adhesion | 10 | 10 | 10 | 10 | 10 | 10 | 10 | 10 | 10 |
| | Hardness | 9 | 8 | 7 | 10 | 10 | 9 | 9.5 | 8 | 9 |
| | Tack | 10 | 10 | 10 | 10 | 10 | 10 | 10 | 10 | 10 |
| | Appearance | 10 | 10 | 9 | 9 | 10 | 9 | 10 | 9 | 9 |

TABLE II

| Run No. | | 1 | 2 | 3 | 4 | 5 | 6 | 7 | 8 | 9 | 10 | 11 | 12 |
|---|---|---|---|---|---|---|---|---|---|---|---|---|---|
| Formulation | LMPBP-MA | 100 | 100 | 100 | 85 | 85 | 85 | 80 | 80 | 80 | 95 | 95 | 95 |
| | 2-HEA | — | — | — | 15 | 15 | 15 | 15 | 15 | 15 | — | — | — |
| | TMPTA | — | — | — | — | — | — | 5 | 5 | 5 | 5 | 5 | 5 |
| | Trig 14 | 10 | 10 | 10 | 10 | 10 | 10 | 10 | 10 | 10 | 10 | 10 | 10 |
| Cure time (seconds) | | 180 | 360 | 612 | 180 | 360 | 612 | 180 | 414 | 612 | 180 | 414 | 540 |
| Tests | MEK Rubs | 10 | 15 | 41 | 4 | 20 | 70 | 7 | 55 | 53 | 15 | 32 | 45 |
| | Adhesion | 10 | 10 | 10 | 10 | 10 | 9 | 10 | 8 | 8 | 8 | 7 | 8 |
| | Hardness | 7 | 9 | 9 | 9 | 9 | 9 | 9 | 9 | 9 | 8 | 7 | 9 |
| | Tack | 10 | 10 | 10 | 10 | 10 | 10 | 10 | 10 | 10 | 10 | 10 | 10 |
| | Appearance | 10 | 10 | 10 | 10 | 10 | 10 | 5 | 5 | 5 | 10 | 10 | 10 |

ILLUSTRATIVE EMBODIMENT I

The non-formulated, maleated LMPBR of Comparative Example II was reacted with 2-hydroxyethylacrylate (2-HEA) at 80°C to form a curable resin according to the present invention (designated LMPBR-MA/2-HEA). The molar ratio of reacted 2-HEA to anhydride was approximately 45:100, or stated differently, about 45% of the anhydride groups were opened. The acrylate content of the curable resin composition was about 0.03 equivalents per 100 grams resin.

It should be noted that in all Illustrative Embodiments one mole of 2-HEA was added for every mole of maleic anhydride. However, as noted therein, some of the anhydride rings were not opened. Therefore, the 2-hydroxyethyl acrylate / maleic anhydride of LMPBR prepared in the Illustrative Embodiments contain small amounts of unreacted 2-hydroxyethyl acrylate.

ILLUSTRATIVE EMBODIMENT II

The 2-hydroxyethyl acrylate/maleic anhydride adduct of LMPBR prepared in Illustrative Embodiment I was formulated with various reactive diluents and photosensitizers for varying cure times. In all runs of Illustrative Embodiment II, the formulated resin compositions were applied to Q-steel panels at a 0.5 mil thickness and subjected to a 100 watt General Electric mercury vapor lamp for varying times. The reactive diluents employed included TMPTA, AMS, the diacrylate of a liquid epoxy resin (DAER), 2-ethylhydroxyacrylate (2-EHA), 2-hydroxyethylacrylate (2-HEA), and neopentylglycoldiacrylate (NPGDA). The diacrylate of a liquid epoxy resin is a stabilized diacrylate derived from the bisglycidyl ether of bisphenol acetone (Epon Resin 828). The photosensitizers employed included Trigonal 14 (a benzoin ether), a dimethylethanol amine (DMEA)/benzophenone (BzP) photosensitizer package, and 2,2-diethoxy-acetophenone (DEAP). The results are presented below in Table IV.

TABLE IV

| Run No. | | 1 | 2 | 3 | 4 | 5 | 6 | 7 | 8 | 9 | 10 | 11 | 12 | 13 |
|---|---|---|---|---|---|---|---|---|---|---|---|---|---|---|
| Formulation | LMPBR-MA/2-HEA | 100 | 100 | 100 | 100 | 100 | 100 | 100 | 95 | 95 | 95 | 100 | 100 | 100 |
| | TMPTA | — | — | — | — | — | — | — | 5 | 5 | 5 | — | — | — |
| | DEAP | — | — | — | — | — | — | — | — | — | — | 10 | 10 | 10 |
| | Trig 14 | — | — | — | — | 10 | 10 | 10 | 10 | 10 | 10 | — | — | — |
| | BzP | — | 10 | 10 | 10 | — | — | — | — | — | — | — | — | — |
| | DMEA | — | 10 | 10 | 10 | — | — | — | — | — | — | — | — | — |
| | AMS | — | 10 | 10 | 10 | — | — | — | — | — | — | — | — | — |
| Cure Time | | 315 | 90 | 180 | 45 | 90 | 180 | 45 | 90 | 180 | 45 | 90 | 180 | 45 |

TABLE IV-continued

| Run No. | | 1 | 2 | 3 | 4 | 5 | 6 | 7 | 8 | 9 | 10 | 11 | 12 | 13 |
|---|---|---|---|---|---|---|---|---|---|---|---|---|---|---|
| (seconds) | | | | | | | | | | | | | | |
| Tests | MEK Rubs | 40 | 12 | 12 | 12 | 13 | 25 | 8 | 18 | 30 | 8 | 12 | 20 | 12 |
| | Adhesion | 10 | 6 | 7 | 10 | 10 | 10 | 10 | 9 | 7 | 5 | 10 | 10 | 10 |
| | Hardness | 10 | 7 | 7 | 9 | 10 | 10 | 10 | 8 | 8 | 9 | 10 | 10 | 9 |
| | Tack | 10 | 10 | 10 | 10 | 10 | 10 | 10 | 10 | 10 | 10 | 10 | 10 | 10 |
| | Appearance | 9 | 9 | 9 | 9 | 9 | 9 | 9 | 9 | 9 | 9 | 10 | 10 | 10 |

ILLUSTRATIVE EMBODIMENT III

In Illustrative Embodiment III, LMPBR was first reacted with maleic anhydride at 180°C in a nitrogen atmosphere and in the presence of about 0.3% weight copper naphthenate. The weight ratio of maleic anhydride to LMPBR was approximately 15:85. The maleated LMPBR was then reacted at about 115° to 120°C with 2-hydroxyethylacrylate (2-HEA) in a molar ratio of 2-HEA to attached anhydride groups of about 100:100. However, only about 90% of the anhydride rings were opened.

The 2-hydroxyethyl acrylate /maleic anhydride adduct of LMPBR was then formulated with various reactive diluents and with a Trigonal 14 photosensitizer. Q-steel panels were coated with the formulated resin at 0.2 to 0.5 mil thickness and subjected to ultra violet light from a 100 watt General Electric mercury vapor lamp for various times. The results are presented below in Table V.

ILLUSTRATIVE EMBODIMENT IV

Illustrative Embodiment IV discloses the effect of post cure on the properties of coated steel panels. The 2-hydroxyethyl acrylate/maleic anhydride adduct of LMPBR prepared in Illustrative Embodiment III was formulated with various reactive diluents and a Trigonal 14 photosensitizer, and the formulated resin was applied to Q-steel panels at a 0.5 mil film thickness. The coated panels were then subjected to ultra violet light from a 100 watt General Electric mercury vapor lamp for varying times. The properties of the cured panels were tested after 2½ hours and also after 23 hours. The results are presented below in Table VI.

TABLE VI

| Run No. | | 1 | 2 | 3 | 4 | 5 | 6 | 7 | 8 | 9 | 10 | 11 | 12 |
|---|---|---|---|---|---|---|---|---|---|---|---|---|---|
| Formulation | LMPBR-MA/2-HEA | 70 | 70 | 60 | 60 | 50 | 50 | 70 | 70 | 60 | 60 | 50 | 50 |
| | DAER | 10 | 10 | 20 | 20 | 30 | 30 | — | — | — | — | — | — |
| | 2-HEA | 20 | 20 | 20 | 20 | 20 | 20 | 20 | 20 | 20 | 20 | 20 | 20 |
| | NPGDA | — | — | — | — | —10 | — | 10 | 10 | 20 | 20 | 30 | 30 |
| | Trig 14 | 10 | 10 | 10 | 10 | 10 | 10 | 10 | 10 | 10 | 10 | 10 | 10 |
| Cure Time (seconds) | | 22.5 | 45 | 22.5 | 45 | 22.5 | 45 | 22.5 | 45 | 22.5 | 45 | 22.5 | 45 |
| Test Results After 2.5 Hours | Hardness | 10 | 10 | 10 | 10 | 10 | 10 | 9 | 10 | 8 | 10 | 3 | 10 |
| | Tack | 10 | 10 | 10 | 10 | 10 | 10 | 9 | 10 7 | 10 | 7 | 10 | |
| | Appearance | 10 | 10 | 10 | 10 | 10 | 10 | 10 | 10 | 9 | 10 | 6 | 7 |
| Test Results After 2.5 Hours | MEK Rubs | 6 | 14 | 7 | 14 | 16 | 21 | 21 | 20 | 3 | >100 | 2 | >100 |
| | Adhesion | 0 | 0 | 9 | 10 | 9 | 9 | 9 | 10 | 9 | 3 | 10 | 1 |
| Test Results After 23 Hours | MEK Rubs | 23 | 27 | 36 | 35 | 36 | 51 | 80 | >100 | 40 | >100 | 30 | >100 |
| | Adhesion | 4 | 9 | 3 | 10 | 7 | 9.5 | 9.5 | 9 | 9 | 10 | 5 | 9 |

ILLUSTRATIVE EMBODIMENT V

In Illustrative Embodiment V, LMPBR was first reacted with maleic anhydride at 180°C in a nitrogen atmosphere and in the presence of 0.3% weight copper naphthenate. The weight ratio of maleic anhydride to

TABLE V

| Run No. | | 1 | 2 | 3 | 4 | 5 | 6 | 7 | 8 | 9 | 10 |
|---|---|---|---|---|---|---|---|---|---|---|---|
| Formulation | LMPBR-MA/2-HEA | 100 | 100 | 90 | 90 | 90 | 90 | 60 | 60 | 50 | 50 |
| | DAER | — | — | — | — | — | — | 30 | 30 | 30 | 30 |
| | Styrene | — | — | — | — | — | — | — | — | 20 | 20 |
| | TMPTA | — | — | — | — | 10 | 10 | — | — | — | — |
| | 2-EHA | — | — | 10 | 10 | — | — | 10 | — | — | — |
| | Trig 14 | 10 | 10 | 9 | 9 | 9 | 9 | 9 | 9 | 8 | 8 |
| Cure Time (seconds) | | 22.5 | 45 | 22.5 | 45 | 22.5 | 45 | 22.5 | 45 | 22.5 | 45 |
| Tests | MEK Rubs | 22 | 30 | 15 | 15 | 45 | 37 | 15 | 20 | 18 | 11 |
| | Adhesion | 5 | 7 | 4 | 1 | 0 | 0 | 2 | 3.5 | 1 | 0 |
| | Hardness | 8 | 10 | 10 | 10 | 10 | 10 | 10 | 10 | 10 | 10 |
| | Tack | 10 | 10 | 10 | 10 | 10 | 10 | 10 | 10 | 10 | 10 |
| | Appearance | 10 | 10 | 9 | 9 | 10 | 10 | 9 | 9 | 10 | 10 |

LMPBR was approximately 11.5:88.5. The maleated LMPBR was then reacted at 115°–120°C with 2-hydroxyethyl acrylate (2-HEA) in a molar ratio of reacted 2-HEA to attached anhydride groups of about 90:100.

The 2-hydroxyethyl acrylate/maleic anhydride adduct of LMPBR was then formulated with various reactive diluents and with a Trigonal 14 photosensitizer. The formulated resins were then applied as coatings on ground steel (GS), tin plate (TP), and cold rolled steel (CRS) panels at less than 1 mil thickness. The coated panels were then cured by exposure to ultra violet light from a 100 watt General Electric mercury vapor lamp for varying time periods. Test results were taken at several time periods after cure. The formulations and test results are presented in Table VII below.

dride at 180°C in a nitrogen atmosphere and in the presence of about 0.3% weight copper naphthenate. The weight ratio of maleic anhydride to LMPBR was approximately 7:93. The maleated LMPBR was applied to cold rolled steel and tin plate panels at 0.5 mil thickness and subjected to thermal baking at 177°C for four minutes. In runs 3 and 4 the maleated LMPBR was first formulated with a Trigonal 14 sensitizer before baking. The results are presented below in Table IX. As in Comparative Example I, where single test values are given the test was taken 72 hours after cure, while where two test values are given the first test was taken after 18.5 hours and the second test was taken after 72 hours.

TABLE VII

| Run No. | | 1 | 2 | 3 | 4 | 5 | 6 | 7 | 8 | 9 | 10 | 11 | 12 |
|---|---|---|---|---|---|---|---|---|---|---|---|---|---|
| Test Panel | | GS | GS | TP | TP | CRS | CRS | GS | GS | TP | TP | CRS | CRS |
| Formulation | LMPBR-MA/2-HEA | 55 | 55 | 55 | 55 | 55 | 55 | 70 | 70 | 70 | 70 | 70 | 70 |
| | DAER | 10 | 10 | 10 | 10 | 10 | 10 | — | — | — | — | — | — |
| | 2-EHA | 20 | 20 | 20 | 20 | 20 | 20 | 20 | 20 | 20 | 20 | 20 | 20 |
| | 2-HEA | 15 | 15 | 15 | 15 | 15 | 15 | 10 | 10 | 10 | 10 | 10 | 10 |
| | Trig 14 | 10 | 10 | 10 | 10 | 10 | 10 | 10 | 10 | 10 | 10 | 10 | 10 |
| Cure Time (seconds) | | 22.5 | 45 | 22.5 | 45 | 22.5 | 45 | 22.5 | 45 | 22.5 | 45 | 22.5 | 45 |
| Test Results After 2.5 Hours | Hardness | 9 | 7 | 7 | 9 | 10 | 10 | 8 | 10 | 8 | 8 | 9 | 9 |
| | Tack | 9 | 10 | 9 | 10 | 10 | 10 | 8 | 10 | 8 | 10 | 10 | 10 |
| | Appearance | 8 | 7 | 10 | 10 | 9 | 9 | 10 | 9 | 10 | 10 | 10 | 9 |
| Test Results After 2.5 Hours | MEK Rubs | 8 | 32 | 3 | 9 | 23 | 44 | 3 | 10 | 10 | 10 | 35 | 33 |
| | Adhesion | 10 | 9.5 | 0 | 0 | 9.5 | 10 | 10 | 10 | 8 | 9 | 9.5 | 9.5 |
| Test Results After 22 Hours | MEK Rubs | 91 | >100 | 10 | 9 | >100 | 72 | 55 | 37 | 25 | 18 | 22 | 90 |
| | Adhesion | 10 | 10 | 0 | 0 | 9.5 | 10 | 10 | 10 | 5 | 1 | 2 | 3.5 |

COMPARATIVE EXAMPLE III

In Comparative Example III, LMPBR was applied to cold rolled steel (CRS) and tin plate (TP) panels at 0.5 mil thickness and subjected to thermal baking at 177°C for four minutes. In runs 3 and 4 the LMPBR was first formulated with a Trigonal 14 sensitizer before baking. The results are presented in Table VIII below. Where single test values are given, the test was taken 72 hours after cure. Where two test values are given, the first test was taken after 18.5 hours and the second test was taken after 72 hours.

TABLE VIII

| Run No. | | 1 | 2 | 3 | 4 |
|---|---|---|---|---|---|
| Formulation | LMPBR | 100 | 100 | 100 | 100 |
| | Trig 14 | — | — | 5 | 5 |
| Type Panel | | CRS | TP | CRS | TP |
| Test Results | MEK Rubs | 47 | 26 | 87 | 37 |
| | Adhesion | 10 | 10 | 10 | 10 |
| | Hardness | 8 | 10 | 9 | 10 |
| | Tack | 8/10 | 8 | 8/10 | 9/10 |
| | Appearance | 10 | 10 | 10 | 10 |

COMPARATIVE EXAMPLE IV

Comparative Example IV reveals the type of thermally cured products obtained with only a maleated LMPBR. The LMPBR was reacted with maleic anhy-

TABLE IX

| Run No. | | 1 | 2 | 3 | 4 |
|---|---|---|---|---|---|
| Formulation | LMPBR-MA | 100 | 100 | 100 | 100 |
| | Trig 14 | — | — | 5 | 5 |
| Type Panel | | CRS | TP | CRS | TP |
| Test Results | MEK Rubs | >100 | >100 | 8/>100 | 7/25 |
| | Adhesion | 10 | 10 | 10/10 | 9.5/10 |
| | Hardness | 10 | 10 | 4/10 | 4/10 |
| | Tack | 10 | 8/10 | 10/10 | 10/10 |
| | Appearance | 10 | 10 | 10 | 10 |

ILLUSTRATIVE EMBODIMENT VI

In Illustrative Embodiment VI, the maleated LMPBR of Comparative Example IV was reacted at 115° to 120°C with 2-hydroxyethyl acrylate (2-HEA) in a molar ratio of reacted 2-HEA to attached anhydride groups of about 90:100. The 2-hydroxyethyl/maleic anhydride adduct of LMPBR-MA/2-HEA) was then applied to cold rolled steel and tin plate panels at 0.5 mil thickness and subjected to thermal baking at 177°C for 4 minutes. In runs 3 and 4 the LMPBR-MA/2-HEA was first formulated with a Trigonal 14 sensitizer before baking. The results are presented below in Table X. Where single test values are given, the test was taken between 72 and 90 hours after cure. Where two test values are given, the first test was taken 18 hours after cure and the second test was taken between 72 and 90 hours after cure.

TABLE X

| Run No. | | 1 | 2 | 3 | 4 |
|---|---|---|---|---|---|
| Formulation | LMPBR-MA/2-HEA | 100 | 100 | 100 | 100 |
| | Trig 14 | — | — | 5 | 5 |
| Type Panel | | CRS | TP | CRS | TP |
| Test Results | MEK Rubs | 46/>100 | 32/>100 | 50/>100 | 65/>100 |
| | Adhesion | 9/10 | 10/10 | 8/10 | 10/10 |
| | Hardness | 7/10 | 6/10 | 8/10 | 9/10 |
| | Tack | 10/10 | 10/10 | 10/10 | 10/10 |
| | Appearance | 10 | 10 | 10 | 10 |

I claim as my invention:
1. A curable resin composition prepared by:
   a. reacting a low molecular weight polybutadiene homopolymer resin having an average molecular weight of between about 500 and about 10,000, a viscosity of between about 50 and about 3,000 centipoises, a cis content of between about 50% and about 95% and containing less than about 2% vinyl bonds with a polycarboxylic acid anhydride of the general formula

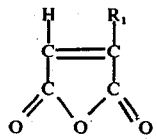

where $R_1$ is selected from the group consisting of H, $CH_3$, and Cl in the presence of an inhibitor selected from the group consisting of particulate copper, copper salts and copper chelate complexes at a temperature of between about 120°C and about 220°C and in a weight ratio of anhydride to polybutadiene resin of between about 5:95 and about 50:50 thereby forming a modified polybutadiene resin having a shifted double bond along the polymer chain and attached anhydride groups;
   b. reacting said modified polybutadiene resin with a hydroxyalkyl acrylate of the general formula

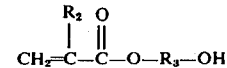

wherein $R_2$ is a hydrogen or methyl group and $R_3$ is an alkyl group of 1 to 10 carbon atoms in a molar ratio of hydroxyalkyl acrylate to attached anhydride group of between about 25:100 and 100:100 and at a temperature of between about 80°C and about 120°C.

2. A composition according to claim 1 wherein the low molecular weight polybutadiene resin has an average molecular weight of between about 1500 and about 2500 and a cis content of between about 60% and about 95%.

3. A composition according to claim 2 wherein said polycarboxylic acid anhydride is maleic anhydride.

4. A composition according to claim 3 wherein said hydroxyalkyl acrylate is 2-hydroxyethyl acrylate.

5. A composition according to claim 4 wherein said weight ratio of anhydride to polybutadiene resin varies from about 5:95 to about 20:80.

6. A composition according to claim 5 wherein said molar ratio of hydroxyalkyl acrylate to anhydride group varies from about 50:100 to about 100:100.

7. The cured resin composition prepared by contacting the curable resin composition of claim 1 with a photosensitizer and subjecting the resulting mixture to ultra violet radiation.

8. The cured resin composition prepared by baking the curable resin composition of claim 1 at about 100° to about 200°C for between about 2 minutes and about 30 minutes.

* * * * *